US011796730B2

(12) United States Patent
Kijima et al.

(10) Patent No.: US 11,796,730 B2
(45) Date of Patent: Oct. 24, 2023

(54) ILLUMINATION DEVICE INCLUDING SECOND PRISM AND BENT PORTION OF REFLECTIVE SHEET AND DISPLAY DEVICE INCLUDING THE SAME

(71) Applicant: Japan Display Inc., Tokyo (JP)

(72) Inventors: Hiroaki Kijima, Tokyo (JP); Shinichi Komura, Tokyo (JP); Koichi Okuda, Tokyo (JP); Ken Onoda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/663,043

(22) Filed: May 12, 2022

(65) Prior Publication Data

US 2022/0365271 A1 Nov. 17, 2022

(30) Foreign Application Priority Data

May 13, 2021 (JP) .................................. 2021-081614

(51) Int. Cl.
*F21V 8/00* (2006.01)
(52) U.S. Cl.
CPC ........... *G02B 6/0036* (2013.01); *G02B 6/009* (2013.01); *G02B 6/0031* (2013.01); *G02B 6/0053* (2013.01); *G02B 6/0076* (2013.01); *G02B 6/0055* (2013.01)
(58) Field of Classification Search
CPC .... G02B 6/009; G02B 6/0036; G02B 6/0038; G02B 6/0076
See application file for complete search history.

(56) References Cited

U.S. PATENT DOCUMENTS

| 9,101,001 | B2* | 8/2015 | Wagner ................ G02B 6/0083 |
| 9,703,032 | B2* | 7/2017 | Wu ....................... G02B 6/0055 |
| 10,551,551 | B2* | 2/2020 | Hsu ...................... G02B 6/0088 |
| 2013/0033901 | A1* | 2/2013 | Nishitani .......... G02F 1/133615 |
| | | | 362/613 |
| 2013/0176749 | A1* | 7/2013 | Chen ..................... G02B 6/006 |
| | | | 362/613 |
| 2015/0029442 | A1* | 1/2015 | Koike .................... G02B 5/045 |
| | | | 349/65 |
| 2021/0041620 | A1  | 2/2021 | Kijima et al. |
| 2023/0010210 | A1* | 1/2023 | Fujisawa .............. G02B 6/0035 |

FOREIGN PATENT DOCUMENTS

JP 2021-26905 A 2/2021

* cited by examiner

*Primary Examiner* — Keith G. Delahoussaye
(74) *Attorney, Agent, or Firm* — Maier & Maier, PLLC

(57) ABSTRACT

According to one embodiment, an illumination device includes a first light guide including a first main surface, a second main surface, a first side surface and a second side surface, a first light source and a first layer including a first prism provided on the second side surface. The first prism protrudes from the second main surface toward the opposite side to the first main surface and has a cross-sectional shape of a triangle with a first slope and a second slope. The incident angle of light emitted from the first light source and entering the first light guide from the second side surface, the angle between the first slope and the first direction, and the angle between the first slope and the second slope are set to values that satisfy the predetermined conditions, respectively.

7 Claims, 12 Drawing Sheets

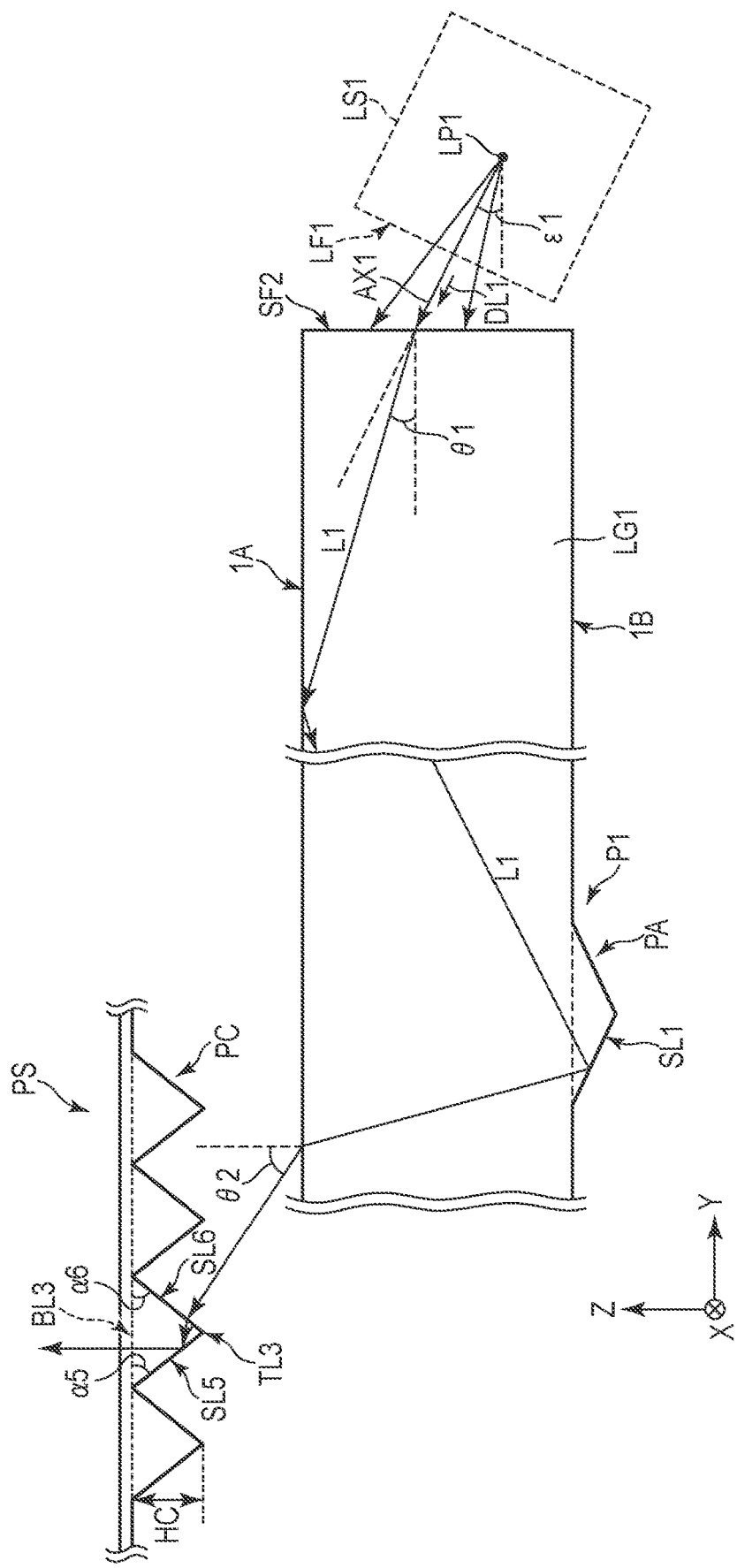
F I G. 5

ILLUMINATION DEVICE INCLUDING SECOND PRISM AND BENT PORTION OF REFLECTIVE SHEET AND DISPLAY DEVICE INCLUDING THE SAME

CROSS-REFERENCE TO RELATED APPLICATIONS

This application is based upon and claims the benefit of priority from Japanese Patent Application No. 2021-081614, filed May 13, 2021, the entire contents of which are incorporated herein by reference.

FIELD

Embodiments described herein relate generally to an illumination device and a display device.

BACKGROUND

For example, display devices such as liquid crystal displays comprise a display panel including pixels and a illumination device such as a backlight that illuminates the display panel. The illumination device comprises a light source that emits light and a light guide to which light from the light source is irradiated. The light from the light source enters the light guide from a side surface of the light guide, propagates inside the light guide, and exits from an exit surface corresponding to one main surface of the light guide. For example, such a configuration that two light guides are stacked one on another is also known. However, in conventional illumination devices, some of the light escapes from the light guide from the side surface of the light guide until exiting from the exit surface, resulting in a decrease in the light light-emitting efficiency.

BRIEF DESCRIPTION OF THE DRAWINGS

FIG. 5 is a partial cross-sectional view showing a light guide, the first layer and a light source shown in FIG. 3.

DETAILED DESCRIPTION

Figure 1:
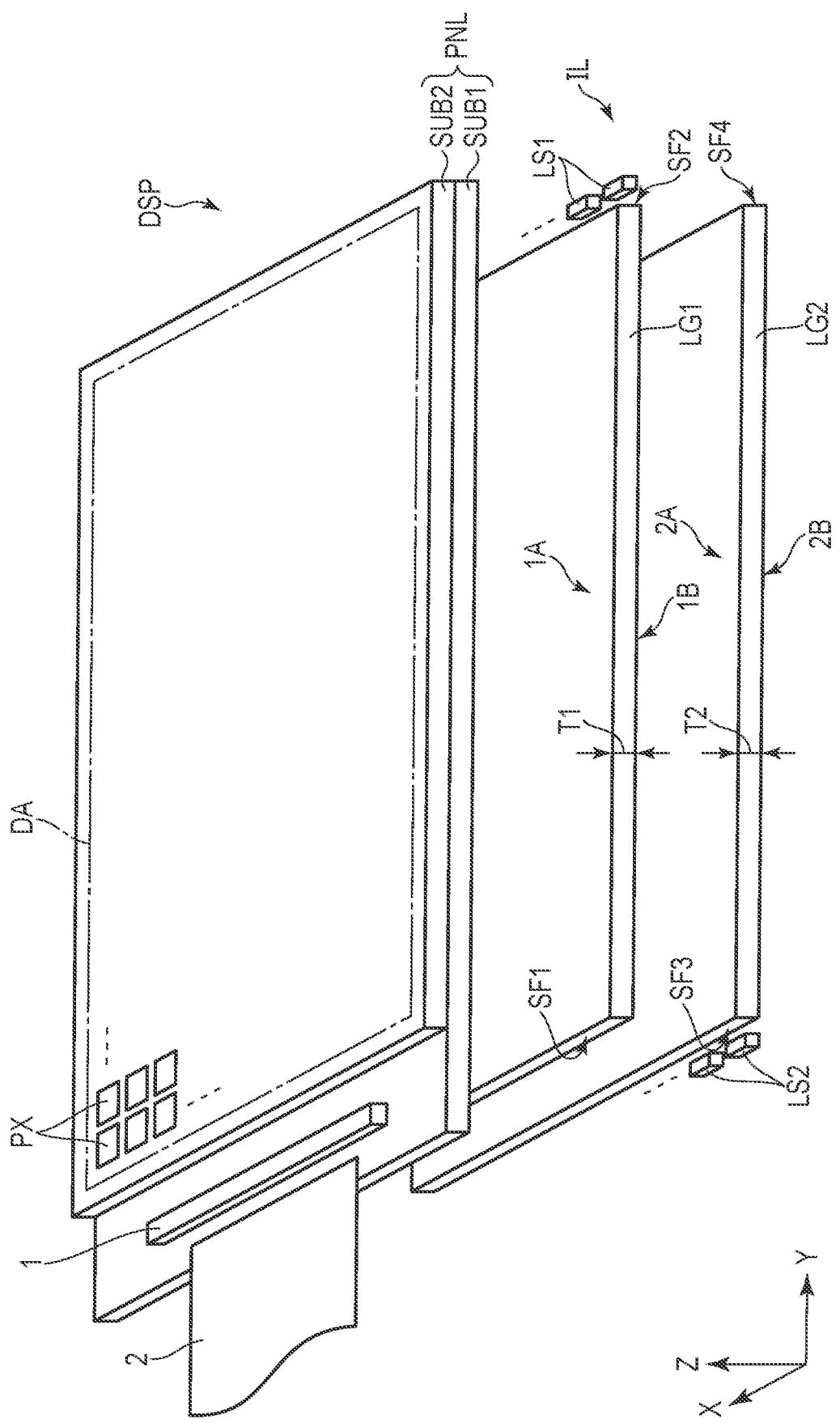
FIG. 1 is an exploded perspective diagram showing a configuration example of a display device according to the first embodiment.

In general, according to one embodiment, an illumination device comprises a first light guide including a first main surface, a second main surface located on an opposite side to the first main surface, a first side surface, and a second side surface located on an opposite side to the first side surface along a first direction, a first light source opposing the second side surface and emitting light to the second side surface and a first layer including a first prism provided on the second side surface. The first prism protrudes from the second main surface toward the opposite side to the first main surface and has a cross-sectional shape of a triangle with a first slope located on a side of the first side surface and a second slope located on a side of the second side surface. Conditions indicated by formulas (2) to (5) provided later being satisfied. $\theta1$ represents an incident angle of the light emitted from the first light source and entering the first light guide from the second side surface. $\alpha1$ represents an angle between the first slope and the first direction. $\gamma$ represents an angle between the first slope and the second slope. $\beta0$ represents an angle for the light entering the first light guide to be totally reflected by the first main surface and the second main surface. $\delta$ represents a range in which the light entering the first guide is diffused.

According to another embodiment, a display device comprises the above-described illumination device, and a display panel which displays images. The display panel opposes the first main surface.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

In this embodiment, a transmissive liquid crystal display device is disclosed as an example of a display device DSP.

Further, as an example of the illumination device, an illumination device used as a backlight for a transmissive liquid crystal display device is disclosed. Note that the main configurations disclosed in this embodiment are also applicable to a liquid crystal display device with a reflective function that reflects outside light and uses the reflected light for display in addition to the transmissive function, an electronic paper display device with electrophoretic elements and the like, a display device to which microelectromechanical systems (MEMS) are applied, or a display device to which electrochromism is applied. The main configurations disclosed in this embodiment are also applicable to illumination devices used for some other usage than backlight.

FIG. 1 is an exploded perspective view of a configuration example of the display device DSP in this embodiment. As shown in FIG. 1, a direction X, a direction Y (a first direction) and a direction Z (a second direction) are defined. The direction X, the direction Y and the direction Z are orthogonal to each other, but may intersect at an angle other than 90 degrees. The direction X and the direction Y correspond to a direction parallel to the main surface of the substrate that constitutes the display device DSP, and the direction Z corresponds to the direction of thickness of the display device DSP.

The display device DSP comprises a display panel PNL, an illumination device IL, an IC chip 1 and a wiring substrate 2.

The display panel PNL comprises a first substrate SUB1 and a second substrate SUB2. The display panel PNL includes a display area DA which displays images. The display panel PNL comprises a plurality of pixels PX arranged in a matrix in the display area DA, for example.

The IC chip 1 and the circuit board 2 read signals from the display panel PNL in some situations, but mainly function as signal sources that supply signals to the display panel PNL. For example, as illustrated in the figure, the IC chip 1 and the wiring substrate 2 are mounted on portions of the first substrate SUB1, which are exposed from the second substrate SUB2. The IC chip 1 may be mounted on the wiring substrate 2. The wiring substrate 2 is, for example, a bendable flexible printed circuit board.

The illumination device IL illuminates the display panel PNL. The illumination device IL comprises a light guide LG1 (a first light guide), a light guide LG2 (a second light guide), a plurality of light sources LS1 (first light sources), a plurality of light sources LS2 (second light sources). The light guide LG2, the light guide LG1, the first substrate SUB1 and the second substrate SUB2 are aligned in this order along the direction Z.

The light guide LG1 is formed as a flat plate parallel to the X-Y plane defined by the direction X and the direction Y. The light guide LG1 has a main surface 1A (a first main surface) opposing the display panel PNL, a main surface 1B (a second main surface) located on an opposite side to the main surface 1A along the direction Z, a side surface SF1 (a first side surface), a side surface SF2 (a second side surface) on an opposite side to the side surface SF1 along the direction Z. The main surface 1A and the main surface 1B are parallel to the X-Y plane, for example. The side surface SF1 and the side surface SF2 are parallel to an X-Z plane defined by, for example, the direction X and the direction Z. The light guide LG1 has a thickness T1. The thickness T1 is a distance from the main surface 1A to the main surface 1B along the direction Z.

The light sources LS1 are arranged to be spaced apart from each other along the direction X. Each light source LS1 opposes the side surface SF2.

The light guide LG2 is formed as a flat plate parallel to the X-Y plane. The light guide LG2 incudes a main surface 2A (a third main surface) opposing the main surface 1B, a main surface 2B (a fourth main surface) located on an opposite side to the main surface 2A along the direction Z, a side surface SF3 (a third side surface) aligned with the side surface SF1 along the direction Z, and a side surface SF4 (a fourth side surface) located on an opposite side to the side surface SF3 along the direction Y and aligned with the side surface SF2 along the direction Z. The main surface 2A and the main surface 2B are parallel to the X-Y plane, for example. The side surface SF3 and the side surface SF4 are parallel to, for example, the X-Z plane. The light guide LG2 has a thickness T2. The thickness T2 is a distance from the main surface 2A to the main surface 2B along the direction Z.

The light sources LS2 are arranged to be spaced apart from each other along the direction X. Each light source LS2 opposes the side surface SF3.

The light source LS1 and the light source LS2 are laser light sources such as semiconductor lasers which emit polarized laser light, for example. The light source LS1 and the light source LS2 are not limited to those which emit laser light, but may be, for example, light-emitting diodes.

The light source LS1 and the light source LS2 may each comprise a plurality of light-emitting elements that emit light of different colors. For example, when the light source LS1 and the light source LS2 each comprise three light-emitting elements emitting red, green, and blue light, light of a mixed color of these (for example, white) can be obtained.

Figure 2:
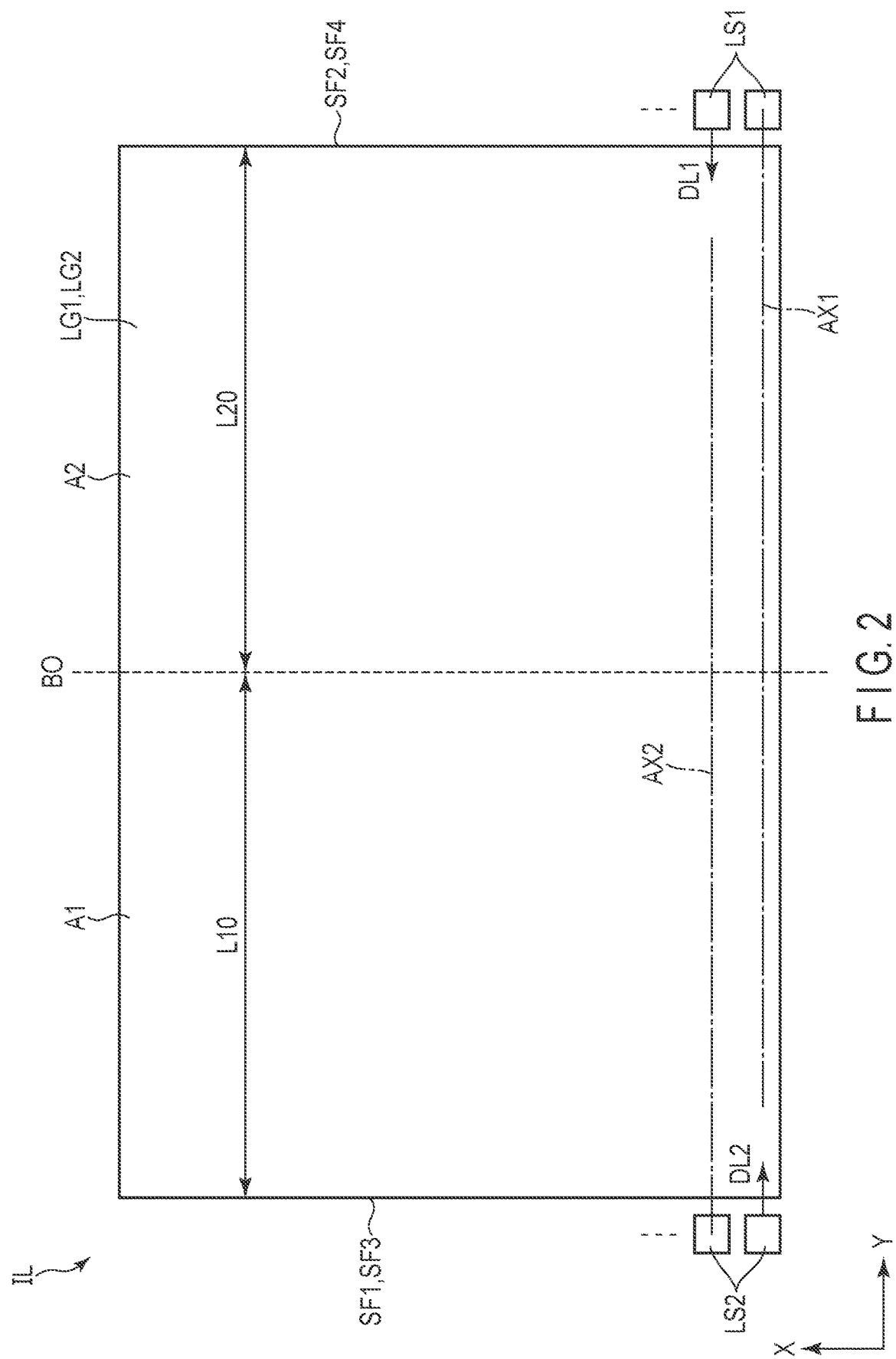
FIG. 2 is a plan view showing an illumination device shown in FIG. 1.

FIG. 2 is a plan view of the illumination device IL shown in FIG. 1. As shown in FIG. 2, the illumination device IL includes a first area A1, a second area A2, a boundary BO between the first area A1 and the second area A2. The first area A1 has a length L10 along the direction Y, and the second area A2 has a length L20 along the direction Y. The length L10 and the length L20 are substantially equal to each other. The length L10 and the length L20 may not be equal to each other. In the example illustrated, the light guide LG1 and the light guide LG2 are located in the entire area of the first area A1 and the entire area of the second area A2, respectively. In other words, the main surfaces 1A, the main surface 1B, the main surface 2A and the main surface 2B are located in the first area A1 and the second area A2, respectively. The side surface SF1 and the side surface SF3 are located in the first area A1, and the side surface SF2 and the side surface SF4 are located in the second area A2. The side surface SF1 and the side surface SF3 overlap each other in plan view, and the side surface SF2 and the side surface SF4 overlap each other in plan view. The boundary BO is equivalent to a midway between the side surface SF1 and the side surface SF2, and between the side surface SF3 and the side surface SF4.

The light source LS1 emits light towards the side surface SF2 along an emission direction DL1. The intensity of the light emitted by the light source LS1 becomes highest along an optical axis AX1, and the emission direction DL1 is parallel to the optical axis AX1. The light source LS2 emits light toward the side surface SF3 along an emission direction DL2. The intensity of the light emitted by light source LS2 becomes highest along an optical axis AX2, and the emission direction DL2 is parallel to the optical axis AX2.

Figure 3:
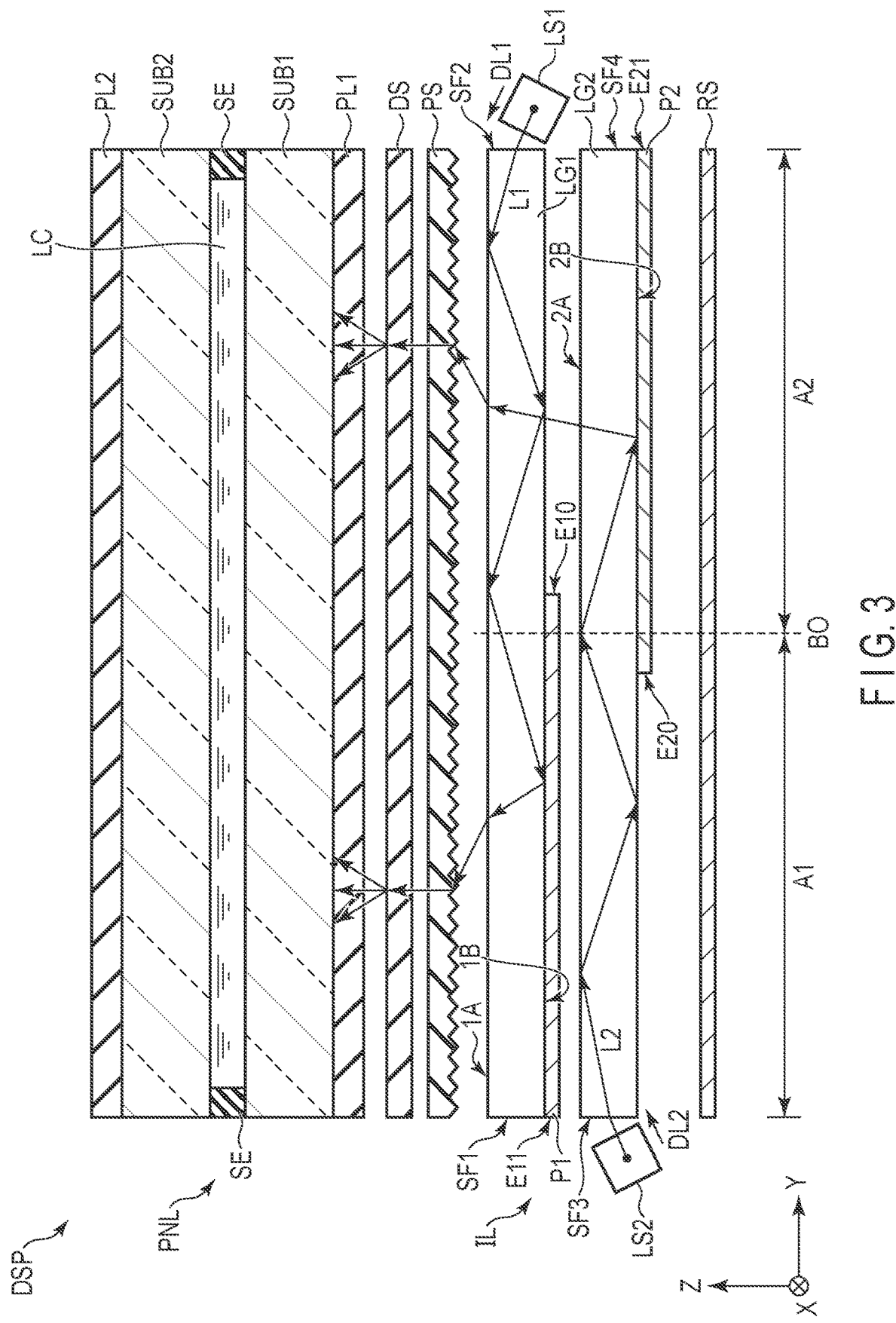
FIG. 3 is a cross-sectional view showing the display device shown in FIG. 1.

FIG. 3 is a cross-sectional view showing the display device DSP shown in FIG. 1. As shown in FIG. 3, the display panel PNL further comprises a liquid crystal layer LC, a sealant SE, a polarizer PL1 and a polarizer PL2.

The liquid crystal layer LC and the sealant SE are located between the first substrate SUB 1 and the second substrate SUB2. The sealant SE adheres the first substrate SUB1 and the second substrate SUB2 to each other and seals the liquid crystal layer LC between the first substrate SUB1 and the second substrate SUB2.

The polarizer PL1 is adhered to a lower surface of the first substrate SUB1. The polarizer PL2 is adhered to an upper surface of the second substrate SUB2. The polarization axis of the polarizer PL1 and the polarization axis of the polarizer PL2 are, for example, orthogonal to each other.

The illumination device IL further comprises a first layer P1, a second layer P2, a diffusion sheet DS, a prism sheet PS and a reflective sheet RS. Note that two prism sheets PS may be provided to overlap each other along the direction Z.

The diffusion sheet DS is located between the display panel PNL and the light guide LG1. The diffusion sheet DS diffuses light entering the diffusion sheet DS to uniform the luminance of the light. The prism sheet PS is located between the diffusion sheet DS and the light guide LG1. For example, the prism sheet PS condenses light emitted from the main surface 1A of the light guide LG1 along the direction Z. The reflective sheet RS opposes the main surface 2B of the light guide LG2. For example, the reflective sheet RS reflects the light leaking from within the light guide LG2, to make it re-enter the light guide LG2.

The first layer P1 and the second layer P2 are each a layer including a plurality of prisms, which will be described below. The first layer P1 is located on the main surface 1B. The first layer P1 extends from the first area A1 over the boundary BO to between the boundary BO and the side surface SF2.

The first layer P1 has an end portion E10 and an end portion E11 on an opposite side to the end portion E10. The end portion E10 is located between the boundary BO and the side surface SF2 and is proximate to the boundary BO. The end portion E11 is proximate to the side surface SF1. For example, the end portion E10 is located at a position which corresponds to the prism closest to the side surface SF2 among the prisms (prisms PA, which will be described later) included in the first layer P1. For example, the end portion E11 is located at a position which corresponds to the prism closest to the side surface SF2 among the prisms included in the first layer P1 (prisms PA, which will be described later).

The second layer P2 is located on the main surface 2B. The second layer P2 extends from the second area A2 over the boundary BO to between the boundary BO and the side surface SF3. The second layer P2 has an end portion E20 and an end portion E21 on an opposite side to the end portion E20. The end portion E20 is located between the boundary BO and the side surface SF3 and is proximate to the boundary BO. The end portion E21 is proximate to the side surface SF4. For example, the end portion E20 is located at the position which corresponds to the prism closest to the side surface SF3 among the prisms (prisms PB which will be described later) included in the second layer P2. For example, the end portion E21 is located at the position which corresponds to the prism closest to the side surface SF4 among the prisms (prisms PB which will be described later) included in the second layer P2.

The first layer P1 and the second layer P2 overlap each other at the boundary BO and in the vicinity of the boundary BO along the direction Z.

The light source LS1 is spaced apart from the side surface SF2. The emission direction DL1 of the light source LS1 is a direction intersecting the normal direction of the side surface SF2. The light source LS2 is spaced apart from the side surface SF3. The emission direction DL2 of the light source LS2 is a direction intersecting the normal direction of the side surface SF3.

The light L1 emitted from the light source LS1 is refracted by the side surface SF2 and enters the light guide LG1. Of the light L1 entering the light guide LG1, a portion of light which proceeds toward the main surface 1A is reflected at the interface between the light guide LG1 and the air layer. Of the light L1 entering the light guide LG1, a portion of the light proceeding toward the main surface 1B is reflected at the interface between the light guide LG1 and the air layer. Thus, the light L1 proceeds within the light guide LG1 while being repeatedly reflected in a portion of the second area A2, where the first layer P1 is not provided.

Of the light L1 proceeding in the light guide LG1, a portion of the light, which proceeds from the light guide LG1 towards the first layer P1 hits the prism of the first layer P1 and changes its proceeding direction to deviate from the total reflection condition of the main surface 1, and is emitted from the main surface 1A. The light emitted from the main surface 1A illuminates the display panel PNL via the prism sheet PS and the diffusion sheet DS. In other words, in the area of the second area A2, where the first layer P1 is not provided (or in the vicinity of the side surface SF2), the light L1 from the side surface SF2 is suppressed from being emitted from the light guide LG1 toward the display panel PNL.

Similarly, light L2 emitted from the light source LS2 is refracted by the side surface SF3 and enters the light guide LG2. The light L2 proceeds within the light guide LG2 while being repeatedly reflected by the main surface 2A and the main surface 2B in a portion of the first area A1, where the second layer P2 is not provided. Of the light L2 proceeding in the light guide LG2, a portion of the light that proceeds from the light guide LG2 toward the second layer P2 hits the prism in the second layer P2 and changes it proceeding direction to deviate from the total reflection condition of the main surface 2A, and is emitted from the main surface 2A. The light emitted from the main surface 2A illuminates the display panel PNL via the light guide LG1, the prism sheet PS and the diffusion sheet DS. In other words, in a region of the first area A1, where the second layer P2 is not provided (or in the vicinity of the side surface SF3), the light L2 from the side surface SF3 is suppressed from being emitted from the light guide LG2 toward the display panel PNL.

The display panel PNL is illuminated mainly by the light from the light source LS1 in the first area A1. The display panel PNL is illuminated mainly by the light from the light source LS2 in the second area A2.

Generally, light from each of a plurality of light sources aligned at intervals proceeds inside the light guide while diffusing, but in the vicinity of the light sources, light portions from the sources do not mix sufficiently. For this reason, in a display device that uses such light as illumination light, there is a risk that uneven luminance, which appears as stripes or chromaticity deviations due to differences in intensity may be visually recognizable when the display area is observed in plan view. Note that the intensity difference of the illumination light is reduced as the location is farther from the light source.

According to this embodiment, in the region of the second area A2, where the first layer P1 is not provided, the light L1 entering from the side surface SF2 is confined within the light guide LG1, and is suppressed from entering the display panel PNL. In the second area A2, the light L1 from the light source LS1 does not substantially enter the display panel PNL, but the light L2 from the light source LS2 illuminates the display panel PNL. The first area A1 is separated from the side surface SF2 by a distance sufficient for the light L1 from the sources to mix together. In this manner, in the first area A1, the degradation of display quality (illumination quality) caused by uneven luminance and chromaticity shift of the illumination light can be suppressed.

Similarly, in the region of the first area A1, where the second layer P2 is not provided, the light L2 entering from the side surface SF3 is confined in the light guide LG2 and is suppressed from entering the display panel PNL. In the first area A1, the light L2 from the light source LS2 PNL does not substantially enter the display panel PNL, but the light L1 from the light source LS1 illuminates the display panel PNL. The second area A2 is separated from the side surface SF3 by a distance sufficient for the light L2 from the sources to mix together. Thus, in the second area A2, the deterioration of display quality (illumination quality) caused by uneven illumination light can be suppressed.

Further, the first layer P1 extends over the boundary BO to the second area A2, and the second layer P2 extends over the boundary BO to the first area A1. In this manner, the situation where the luminance level of the light emitted from the illumination device IL decreases in the vicinity of the boundary BO can be avoided. Note that when the end portion E10 of the first layer P1 and the end portion E20 of the second layer P2 2 are located at the boundary BO, the luminance level of the light emitted from the illuminating device IL may decrease in the vicinity of the boundary BO.

Figure 4:
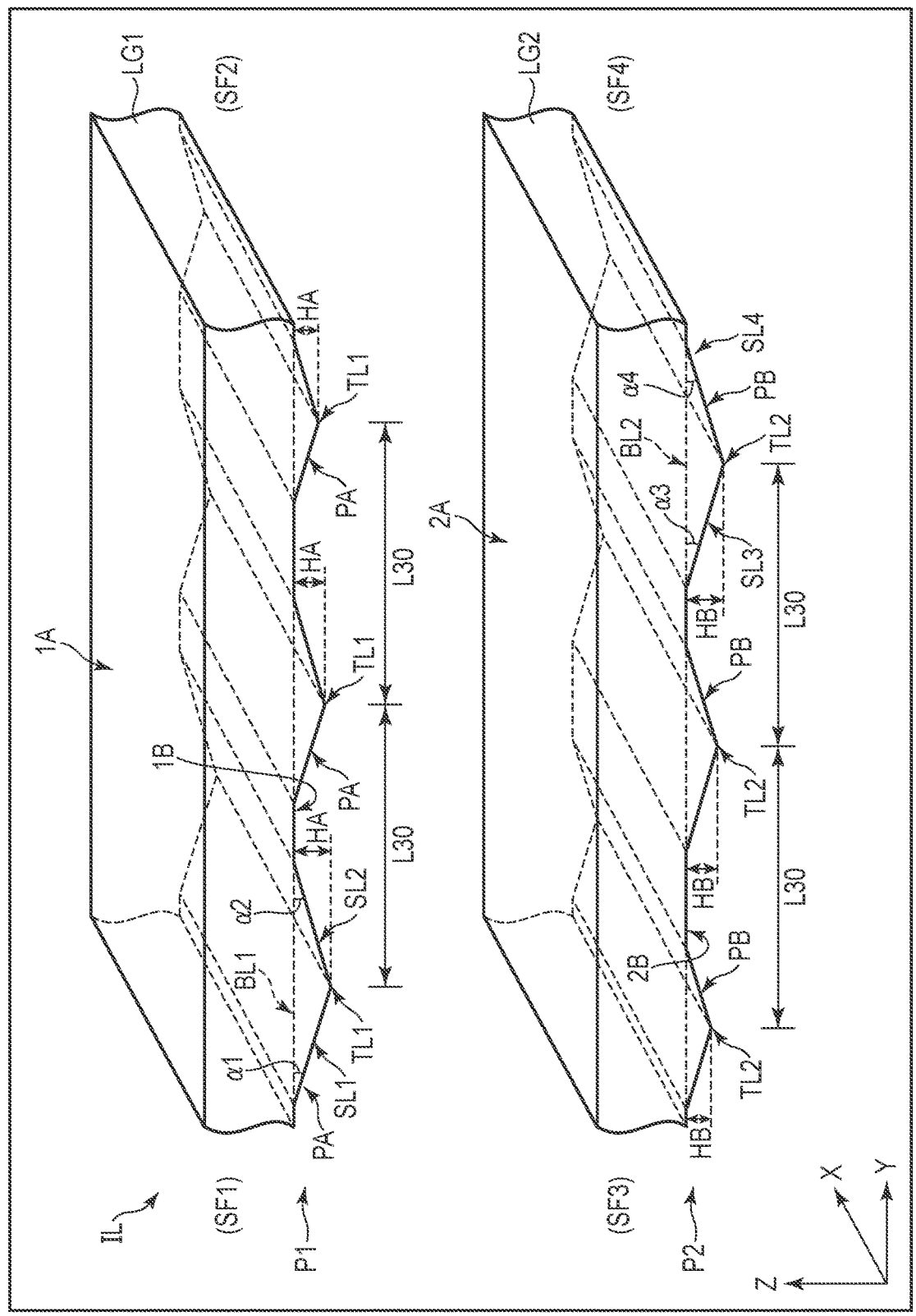
FIG. 4 is a perspective view showing the illumination device shown in FIG. 3, illustrating the shapes of a first layer and a second layer.

FIG. 4 is a diagram illustrating the shape of each of the first layer P1 and the second layer P2, which perspectively showing the illumination device IL in FIG. 3. FIG. 4 shows only a part of the light guide LG1, a part of the light guide LG2, a part of the first layer P1 and a part of the second layer 2, of the illumination device IL.

As shown in FIG. 4, the first layer P1 includes a plurality of prisms PA (first prisms). The first layer P1 is constituted by the prisms PA intermittently aligned along the direction Y. The second layer P2 includes a plurality of prisms PB (second prisms). The second layer P2 is constituted by the prisms PB intermittently aligned along the direction Y. The prisms PA are provided on the main surface 1B. The prisms PB are provided on the main surface 2B. For example, the prisms PA are formed to be integrated with the light guide LG1 as one body. Similarly, the prisms PB are formed to be integrated with the light guide LG2 as one body.

The prisms PA protrude from the main surface 1B toward the main surface 2A. The prisms PA have a cross-section of a triangular shape parallel to the Y-Z plane, and extend along the direction X. For example, the cross-sectional shapes of the prisms PA which are parallel to the Y-Z plane are similar to each other. The prisms PA each include a slope SL1 (a first slope), a slope SL2 (a second slope), a reference surface BL1, a line of intersection TL1, and has a height HA.

The slope SL1 is located on a side surface SF1 side, and the slope SL2 is located on a side surface SF2 side. The reference surface BL1 is located on the same plane as that of the main surface 1B. The intersection line TL1 is the line where the slope SL1 and the slope SL2 intersect each other.

A plurality of intersection lines TL1 are aligned at equal intervals L30 along the direction Y. The intervals L30 are, for example, 0.1 mm. In the example illustrated, an angle α1 made between the slope SL1 and the reference surface BL1 and an angle α2 between the slope SL2 and the reference surface BL1 are equal to each other. Note that the angle α1 corresponds to one of the interior angles in the cross-section of the prism PA, and the angle α2 corresponds to another one of the interior angles in the cross-section of the prism PA. The angle α1 and the angle α2 may be referred to as the prism angles of the prism PA. The cross-section of the prism PA is an isosceles triangle. The height HA is the height of the prism PA along the normal direction of the main surface 1B, and equivalent to the length from the reference surface BL1 to the intersection line TL1 along the direction Z.

The height HA of the prism PA is lower depending on the location thereof from the side surface SF1 to the side surface SF2. In other words, the height HA of the respective one of the prisms PA becomes higher as the location of that prism is farther from the light source LS1. As the respective prism is located from the end portion E10 towards the end portion E11, the ratio of the prism PA (the reference surface BL1) per unit area in the X-Y plane increases, and the proportion of the main surface 1B per unit area in the X-Y plane decreases. On the other hand, when light proceeding in the light guide LG1 enters the prism PA in the first layer P1 and is emitted from the light guide LG1, the amount of light proceeding in the light guide LG1 decreases. As a result, the illumination device IL can irradiate illumination light that has uniform luminance distribution in the first area A1 onto the display panel PNL.

The prisms PB protrudes from the main surface 2B to the opposite side of the main surface 2A along the direction Z. The prisms PB each have a cross-section of a triangular shape parallel to the Y-Z plane, and extend along the direction X. For example, the cross-sectional shapes of the prisms PB parallel to the Y-Z plane are similar to each other. The prisms PB each include a slope SL3 (a third slope), a slope SL4 (a fourth slope), a reference surface BL2, a line of intersection TL2, and has a height HB.

The slope SL3 is located on a side surface SF3 side, and the slope SL4 is located on a side surface SF4 side. The reference surface BL2 is located on the same plane as that of the main surface 2B. The intersection line TL2 is a line where the slope SL3 and the slope SL4 intersect each other.

A plurality of intersection lines TL2 are aligned at equal intervals L30 along the direction Y. In the example illustrated, an angle α3 made between the slope SL3 and the reference surface BL2 and an angle α4 made between the slope SL4 and the reference surface BL2 are equal each other. Note that the angle α3 corresponds to one of the interior angles in the cross-section of the prism PB, and the angle α4 corresponds to another one of the interior angles in the cross-section of prism PB. The angle α3 and the angle α4 may be referred to as prism angles of the prism PB. The cross-section of the prism PB is an isosceles triangle. The height HB is the height of the prism PB in the normal direction of the main surface 2B, and is equivalent to the length from the reference surface BL2 to the intersection line TL2 along the direction Z.

The height HB of the respective prism PB is greater depending on the location thereof from the side surface SF4 to the side surface SF3. In other words, the height HB of the respective one of the prisms PB becomes higher as the location of that prism is farther from the light source LS2. As the respective prism is located from the side surface SF4 to the side surface SF3, the ratio of the prism PB (the reference surface BL2) per unit area in the X-Y plane decreases, and the proportion of the main surface 2B per unit area in the X-Y plane increases. On the other hand, when light proceeding in the light guide LG2 enters the prism PB in the second layer P2 and is emitted from the light guide LG2, the amount of light proceeding in the light guide LG2 decreases. As a result, the illumination device IL can irradiate illumination light that has uniform luminance distribution in the second area A2 onto the display panel PNL.

FIG. 5 shows a partial cross-sectional view of the light guide LG1, the first layer P1 and the light source LS1 shown in FIG. 3. As shown in FIG. 5, the light source LS1 includes a light-emitting point LP1 and a light-exiting surface LF1. The light-emitting point LP1 is point from which the light L1 having an optical axis AX1 parallel to the emission direction DL1 is emitted. The light L1 emitted from the light-emitting point LP1 proceeds while diffusing. The light-exiting surface LF1 corresponds to the outer surface of the light source LS1, for example.

The emission direction DL1 is inclined with respect to the direction Y and the direction Z. The emission direction DL1 and the side surface SF2 are not orthogonal to each other. In other words, the emission direction DL1 intersects the normal direction of the side surface SF2. As a result, the light L1 is refracted when it enters the light guide LG1. An incidence angle θ1 of the light L1 at the light guide LG1 is smaller than the angle made between the emission direction DL1 and the direction Y.

In the example illustrated, the light L1 proceeding in the light guide LG1 is reflected by the slope SL1 of the prism PA. The light L1 reflected at the slope SL1 deviates from the total reflection condition of the main surface 1A and is refracted at the interface between the main surface 1A and the air layer. Then, the light is emitted from the main surface 1A at an exit angle θ2. The exit angle θ2 is an angle made between the light emitted from the main surface 1A and the normal of the main surface 1A. The refractive index of the light guide LG1 is represented by n.

The light L1 emitted at the exit angle θ2 is condensed by the prism sheet PS along the direction Z and illuminates the display panel PNL via the diffusion sheet DS.

The prism sheet PS is constituted by a plurality of prisms PC continuously aligned along the direction Y. The prisms PC protrude toward the main surface 1A along the direction Z. The prisms PC each have a cross-section of a triangular shape parallel to the Y-Z plane, and extend along the direction X. For example, the cross-sectional shapes of the prisms PC parallel to the Y-Z plane are similar to each other. The prisms PC includes a slope SL5, a slope SL6, a reference surface BL3, a line of intersection TL3, and has a height HC. The slope SL5 is located on a side surface SF1 side and a side surface SF3 side, and the slope SL6 is located on a side surface SF2 side and a side surface SF4 side. The reference surface BL3 is located on the same plane as that of the X-Y plane. The intersection line TL3 is a line where the slope SL5 and the slope SL6 intersect each other.

In the example illustrated, an angle α5 made between the slope SL5 and the reference surface BL3 and an angle SL6 made between the slope SL6 and the reference surface BL3 are equal to each other. Note that the angle α5 corresponds to one of the interior angles in the cross-section of the prism PC, and the angle α6 corresponds to another one of the interior angles in the cross-section of the prism PC. The angle α5 and the angle α6 may be referred to as base angles of an inverse prism. The angle α5 and the angle α6 are set at angles to condense the light L1 exiting at the exit angle θ2 along the direction Z. The height HC corresponds to the length from the reference surface BL3 to the intersection line TL3 along the in direction Z.

Note that among the incident angle θ1, the refractive index n, and an angle ε1 made between the exiting direction DL1 and the direction Y, the relationship expressed by the following formula (1) is established. The angle ε1 may be in some cases referred to as an elevation angle.

$$\theta 1 = \sin^{-1}\left\{\left(\frac{1}{n}\right)\sin\varepsilon 1\right\} \quad (1)$$

A configuration similar to that shown in FIG. 5 can be applied to the side surface SF3 and the light source LS2 as well. In other words, the emission direction DL2 of the light source LS2 is not orthogonal to the side surface SF3, but intersects the emission direction DL2 and the normal direction of the side surface SF3. Note that the configurations of the side surfaces SF3 and the light source LS2 may be different those shown in FIG. 5.

Here, of the light entering the light guide LG1, a portion which cannot be extracted from the main surface 1A of the light guide LG1, but passes out from another surface of the light guide LG1 (hereinafter referred to as "escaping light"), will be described. Note that the escaping light of the light guide LG1 will be described below, but similar escaping light exist in the light guide LG2 as well.

Figure 6:
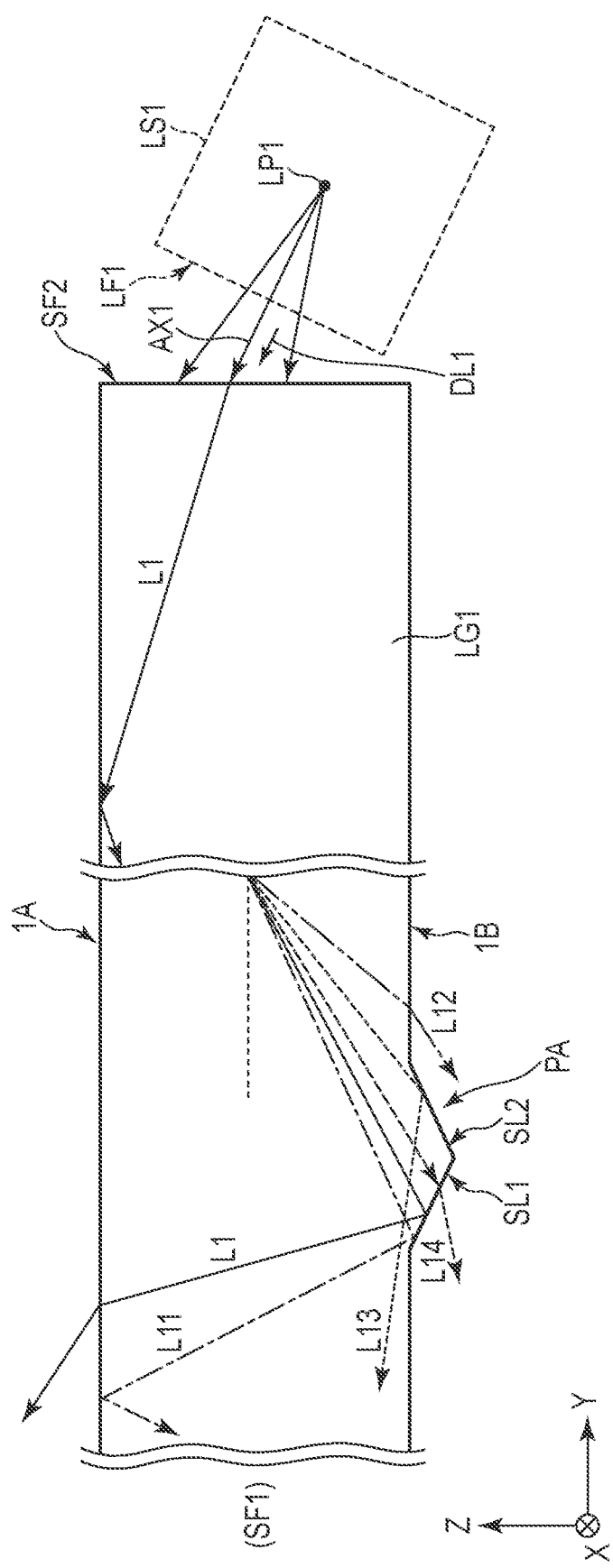
FIG. 6 is a partial cross-sectional view showing the light guide, the first layer and the light source, illustrating light escaping from the light guide.

The light L1, which travels the light path indicated by the solid line in FIG. 6, is the main ray of the incident light entering the light guide LG1, which has an optical axis AX1 parallel to the exiting direction DL1. The main ray L1 of the incident light is reflected by a slope SL1 of the prism PA, located on a back side as seen from the light source LS1, and then proceeds toward the main surface 1A, deviates from the total reflection condition at the main surface 1A, and then is emitted from the main surface 1A, which is the exiting surface.

On the other hand, one of the optical paths in which the escaping light travels is considered to be an optical path in which the light L11 travels in FIG. 6 (the optical path indicated by the single-dotted line in FIG. 6). The light L11 is reflected by a slope SL1 of the prism PA, located on a back side as seen from the light source LS1 and proceeds toward the main surface 1A, but the light L11 is totally reflected again on the main surface 1A, and is not emitted from the main surface 1A, which is the light-exiting surface.

One of the optical paths in which the escaping light travels is considered to be an optical path in which the light L12 travels in FIG. 6 (the optical path indicated by the two-dot chain line in FIG. 6). The light L12 is deviated from the total reflection condition in the main surface 1A, and emitted from the main surface 1B, and thus is not emitted from the main surface 1A, which is the light-exiting surface.

One of the optical paths in which the escaping light travels is considered to be an optical path in which the light L13 travels in FIG. 6 (the optical path indicated by the two-dot chain line in FIG. 6). The light L13 is reflected by a slope SL2 of the prism PA, located on a front side as seen from the light source LS1 and proceeds toward the side surface SF1 without being directed to the main surface 1A. Thus, the light L13 is not emitted from the main surface 1A.

One of the optical paths in which the escaping light travels is considered to be an optical path in which the light L14 travels in FIG. 6 (the optical path indicated by the long broken line in FIG. 6). The light L14 is not reflected by a slope SL1 of the prism PA, located on a back side as seen from the light source LS1, but is emitted from the prism PA. Thus, the light L14 is not emitted from the main surface 1A.

In order to reduce the amount of escaping light such as the light L11 shown in FIG. 6, it should be configured such that the light L11, which has an incident angle smaller than that of the main ray L1, is reflected on the back slope SL1 of the prism PA, and then proceeds toward the main surface 1A, and then deviate from the total reflection condition of the main surface 1A to be emitted therefrom.

Figure 7:
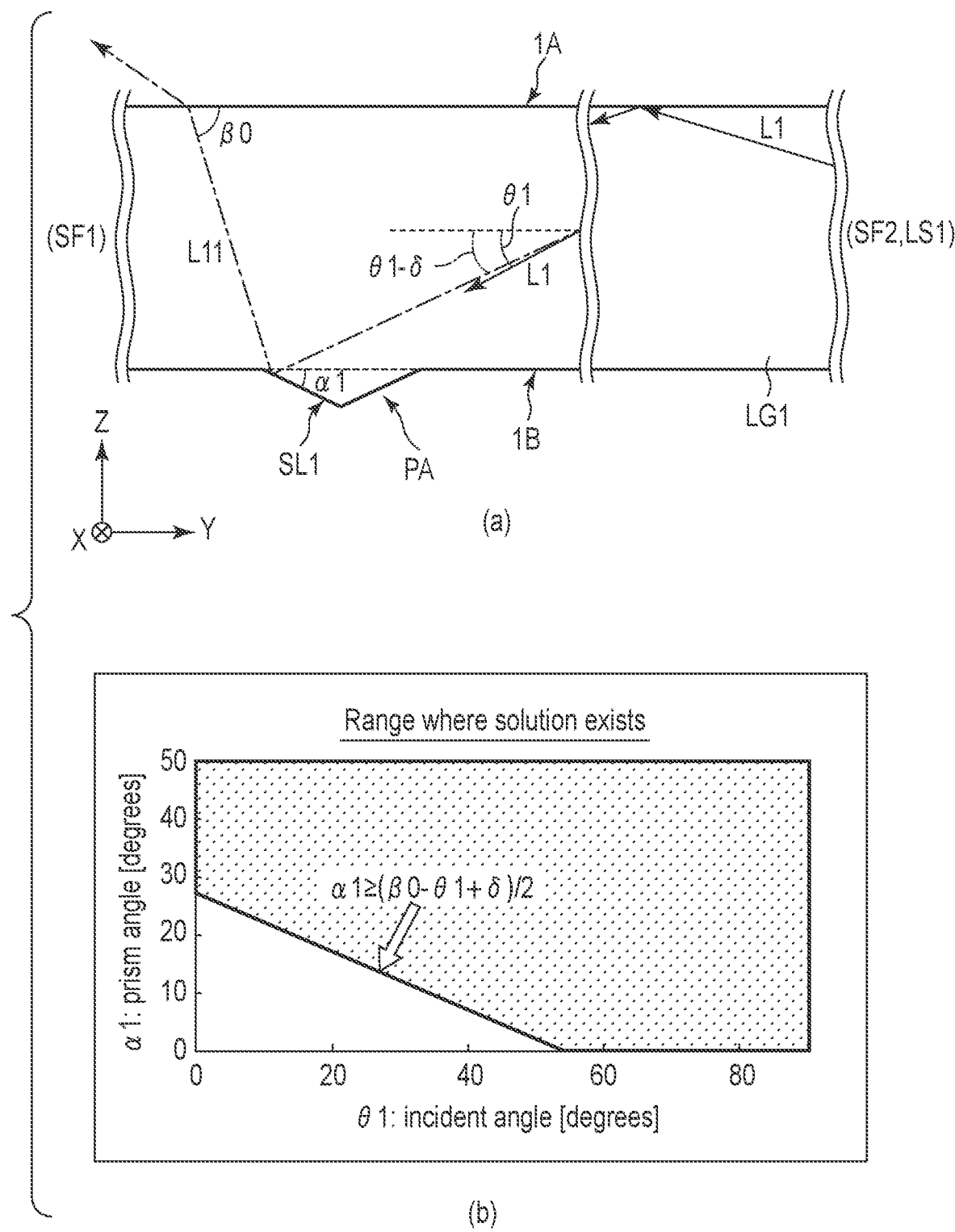
FIG. 7 is a partial cross-sectional view showing the light guide and the first layer, illustrating the conditions for a minimum angular component to exit from the exiting surface.

In order for the light L11, which has an incident angle smaller than that of the main ray L1, to proceed toward the main surface 1A and deviate from the total reflection condition at the main surface 1A to be emitted therefrom as much possible, the incident angle $\theta 1$ and the prism angle $\alpha 1$ should be set such that the light L11 with the smallest incident angle is reflected by the slope SL1 on the back side of the prism PA and emitted from the main surface 1A, as shown in FIG. 7, part (a). In the following descriptions, the light with the smallest incident angle may be referred to as a minimum angle component.

As described above, the light emitted from the light source LS1 proceeds while diffusing, and therefore the incident light entering the light guide LG1 is also diffused in the range of the radiation angle $\pm\delta$ of the incident light from the incident angle $\theta 1$ of the main ray L1. The minimum angular component is a portion of the light that spreads from the main ray L1 of the incident light, which is farthest away from the main ray L1 in the clockwise direction and has the smallest angle made with the direction Y. Therefore, the incident angle of the minimum angular component can be expressed as $\theta 1-\delta$.

As shown in FIG. 7, part (a), in order for the minimum angle component with the incident angle $\theta 1-\delta$ to be reflected by the slope SL1 on the back side of the prism PA and emitted from the main surface 1A, the incident angle $\theta 1$ and the prism angle $\alpha 1$ should be set to satisfy the conditions expressed by the formula (2) below.

Note that $\beta 0$ provided in the formula (2) indicates the angle of the total reflection condition. When the angle made between the light L11 and the main surface 1A is less than the angle $\beta 0$ of the total reflection condition, the light L11 is totally reflected at the main surface 1A. On the other hand, if the angle made between the light L11 and the main surface 1A is greater than the angle $\beta 0$ of the total reflection condition, the light L11 deviates from the total reflection condition and is extracted from the main surface 1A, that is, the light-exiting surface. The angle $\beta 0$ of the total reflection condition is a fixed value calculated by subtracting the critical angle calculated based on the refractive index n of the light guide LG1 and the refractive index of the air layer from 90 degrees, and when the light guide LG1 is made of glass, for example, it is 48 degrees. Further, the radiation angle $\delta$ of the incident light is a value based on the characteristics of the light source LS1, which is, for example, 6.5 degrees.

$$\alpha 1 \geq \frac{\beta 0 - \theta 1 + \delta}{2} \quad (2)$$

The horizontal axis of the graph shown in FIG. 7, part (b) indicates the incident angle $\theta 1$ of the main light ray L1, and the vertical axis indicates the prism angle $\alpha 1$ of the prism PA. The dotted hatched area in the graph shown in FIG. 7, part (b) indicates the range where a combination of the incident angle $\theta 1$ and the prism angle $\alpha 1$, that satisfy the condition expressed by the formula (2) above can exist (or a range in which a solution ($\theta 1$, $\alpha 1$) can exist) when the angle $\beta 0$ of the total reflection condition is 48 degrees and the radiation angle $\delta$ of the incident light is 6.5 degrees. In other words, when the angle $\beta 0$ of the total reflection condition is 48 degrees and the radiation angle $\delta$ of the incident light is 6.5 degrees, the incident angle $\theta 1$ and the prism angle $\alpha 1$ should be set any values within the dotted hatched area, then as shown in FIG. 7, part (a), the minimum angular component of the incident angle $\theta 1-\delta$ can be reflected on the slope SL1 on the back side of the prism PA and emitted from the main surface 1A, which is the light-exiting surface.

In order to reduce the amount of escaping light such as the light L12 shown in FIG. 6, the light L12, which has an incident angle larger than that of the main ray L1 should be totally reflected at the main surface 1B without deviating from the total reflection condition and proceed within the light guide LG1.

Figure 8:
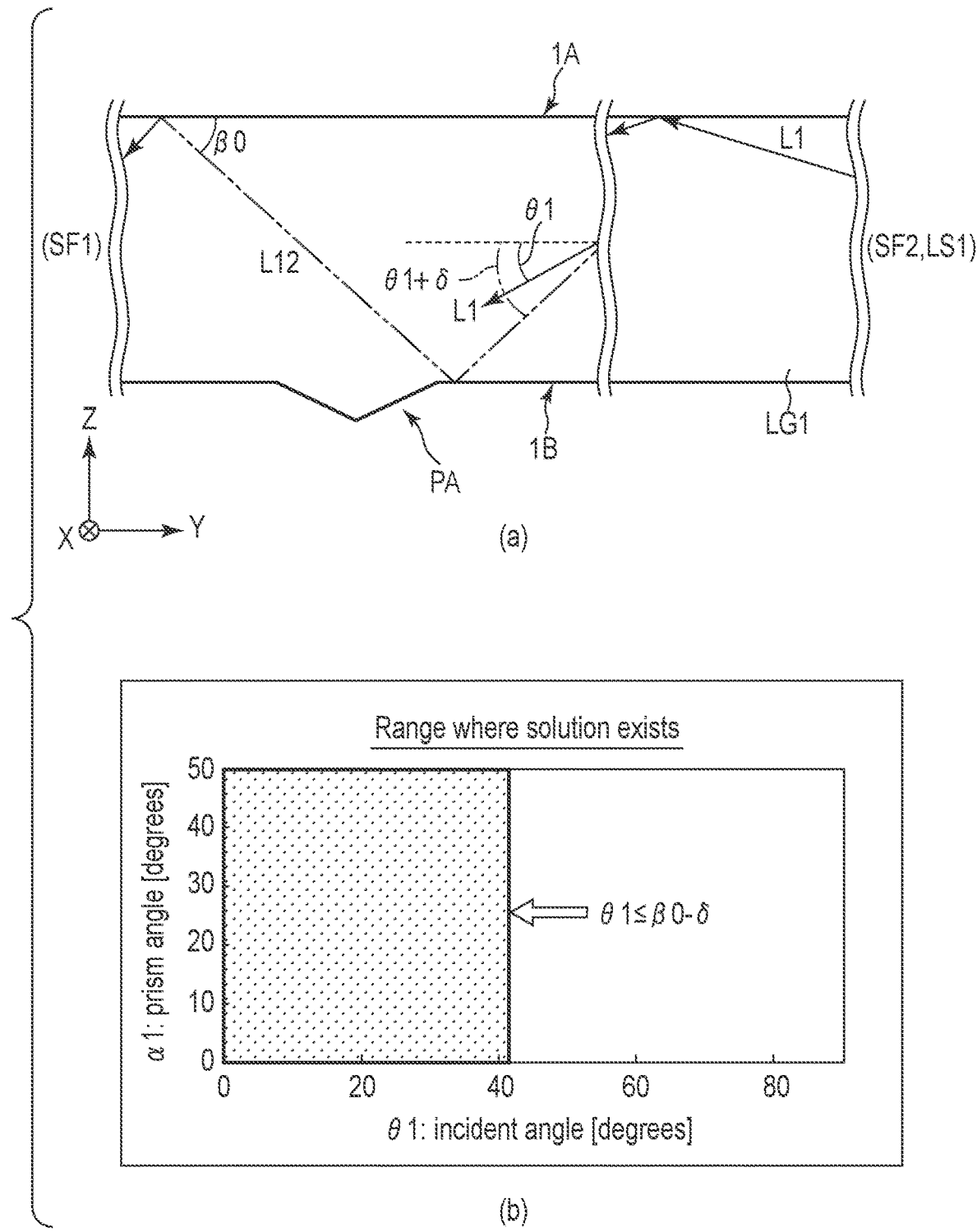
FIG. 8 is a partial cross-sectional view showing the light guide and the first layer, illustrating the conditions for a maximum angular component to exit from the exiting surface.

In order for the light L12, which has an incident angle larger than that of the main ray L1, to be totally reflected without deviating from the total reflection condition in the main surface 2A and proceed in the light guide G1 as much possible, the incident angle $\theta 1$ should be set such that the light L12 with the largest incident angle is reflected by the main surface 1B without deviating from the total reflection condition and proceed in the light guide G1, as shown in FIG. 8, part (a). In the following descriptions, the light with the largest incident angle may be referred to as a maximum angle component. The maximum angle component is a portion of the light that spreads out from the main ray L1 of the incident light, which is farthest from the main ray L1 in the counterclockwise direction, and has the largest angle made with the direction Y. Therefore, the incident angle of the maximum angular component can be expressed as $\theta 1+\delta$.

As shown in FIG. 8, part (a), in order for the maximum angle component with the incident angle $\theta 1+\delta$ to be totally reflected at the main surface 1B without deviating from the total reflection condition and proceed within the light guide LG1, the incident angle $\theta 1$ should be set such as to satisfy the condition expressed by the following formula (3).

$$\theta 1 \leq \beta 0 - \delta \quad (3)$$

The horizontal axis of the graph shown in FIG. 8, part (b) indicates the incident angle $\theta 1$ of the main light ray L1, and the vertical axis indicates the prism angle $\alpha 1$ of the prism PA. Note that the prism angle $\alpha 1$ is not relevant in the above-provided formula (3), it is a fixed value in the graph shown in FIG. 8, part (b). The dotted hatched area in the graph shown in FIG. 8, part (b), indicates a range in which the incident angle $\theta 1$ which satisfies the condition of the formula (3) can exist when the angle $\beta 0$ of the total reflection condition is 48 degrees and the radiation angle $\theta$ of the incident light is 6.5 degrees. In other words, when the angle $\beta 0$ of the total reflection condition is 48 degrees and the radiant angle $\delta$ of the incident light is 6.5 degrees, the incident angle $\theta 1$ should be set to any value within the dotted hatched area, and thus as shown in FIG. 8, part (a), the maximum angle component of the incident angle $\theta 1+\delta$ can be totally reflected at the main surface 1B without deviating from the total reflection condition to proceed in the light guide LG1.

In order to reduce the amount of escaping light such as the light L13 shown in FIG. 6, the light L13, which has an incident angle larger than that of the main ray L1, should not hit the slope SL2 on the front side of the prism PA, but instead hit the slope SL1 on the back side of the prism PA.

Figure 9:
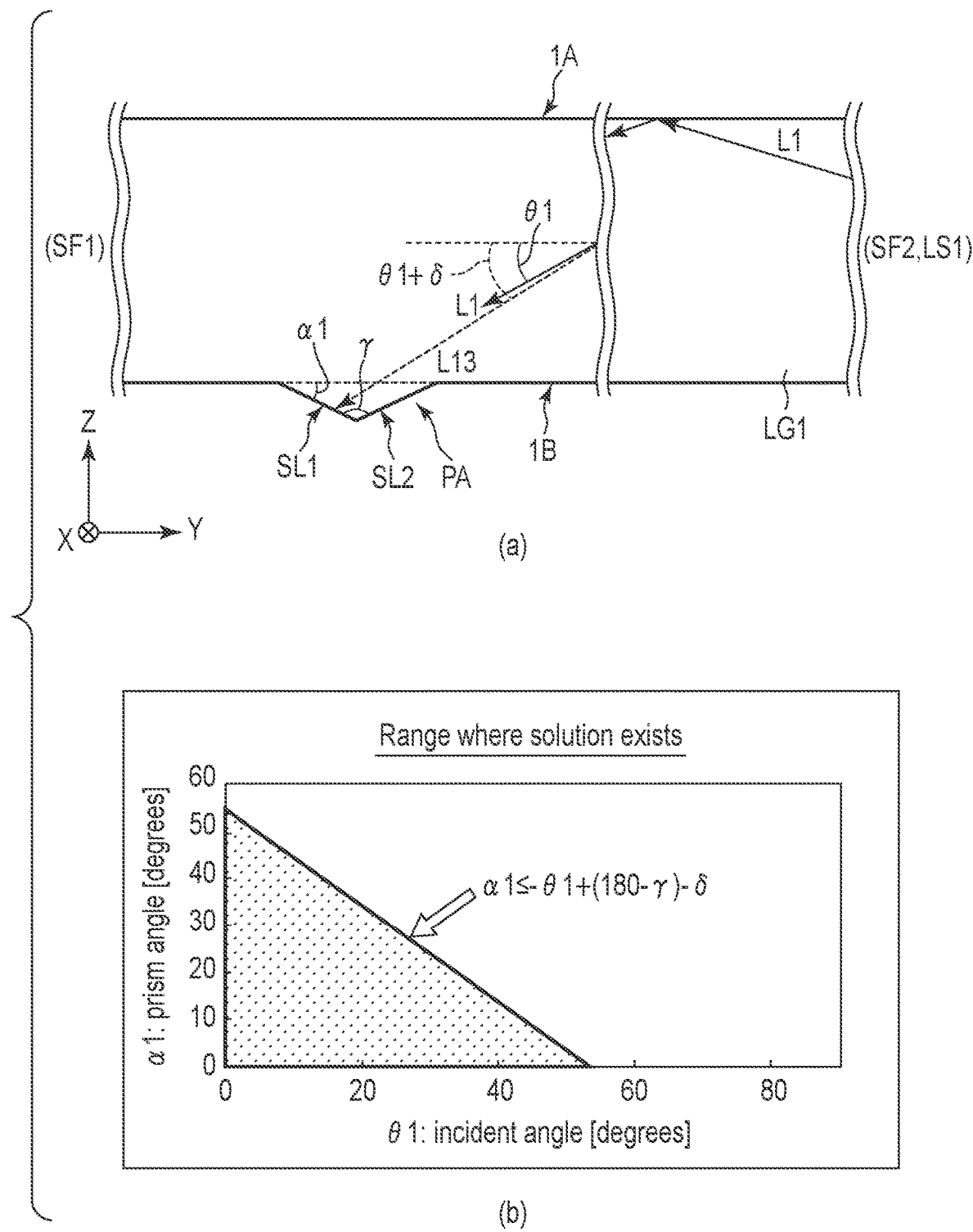
FIG. 9 is a partial cross-sectional view showing the light guide and the first layer, illustrating other conditions for the maximum angular component to exit from the exiting surface.

In order for the light L13 having an incident light greater than that of the main ray L1, not to hit the slope SL2 on the front side of the prism PA, but instead to hit the slope SL1 on the back side of the prism PA, the incident angle $\theta 1$ and the prism angle $\alpha 1$ should be set such that, as shown in FIG. 9, part (a), the maximum angular component of the incident angle θ1+δ does not hit the slope SL2 on the front side of the prism PA, but instead hits the slope SL1 on the back side of the prism PA.

As shown in FIG. 9, part (a), in order for the maximum angle component of the incident angle θ1+δ not to hit the slope SL2 on the front side of the prism PA, but instead to hit the slope SL1 on the back side of the prism PA, the incident angle θ1 and the prism angle α1 should be set to satisfy the condition expressed by the formula (4) below. Note that γ provided in the formula (4) is an angle made between the slope SL2 on the front side of the prism PA and the slope SL1 on the back side of the prism PA. The angle γ may as well be referred to as the prism apical angle. Note that the details of the prism apical angle γ will be described later, and therefore a detailed description thereof is be omitted here.

$$\alpha 1 \leq -\theta 1+(180-\gamma)-\delta \quad (4)$$

The horizontal axis of the graph shown in FIG. 9, part (b) indicates the incident angle θ1 of the main ray L1, and the vertical axis indicates the prism angle α1 of the prism PA. The dotted hatched area in the graph shown in FIG. 9, part (b) indicates the range where a combination of the incident angle θ1 and the prism angle α1, that satisfy the condition expressed by the formula (4) above can exist when the angle β0 of the total reflection condition is 48 degrees and the radiation angle δ of the incident light is 6.5 degrees. That is, when the angle β0 of the total reflection condition is 48 degrees and the radiation angle δ of the incident light is 6.5 degrees, the incident angle θ1 and prism angle α1 should be set to any of the values within the dotted hatched area, and thus, as shown in FIG. 9, part (a), the maximum angular component of the incident angle θ1+δ can be directed not to hit the slope SL2 on the front side of the prism PA, but instead to hit the slope SL1 on the back side of the prism PA.

In order to reduce the amount of escaping light such as the light L14 shown in FIG. 6, the incident angle θ1 and the prism angle α1 should be set such that the light L14, which has an incident angle larger than that of the main ray L1, is totally reflected by the slope SL1 on the back side of the prism PA without deviating from the total reflection condition, and proceeds in the light guide LG1.

Figure 10:
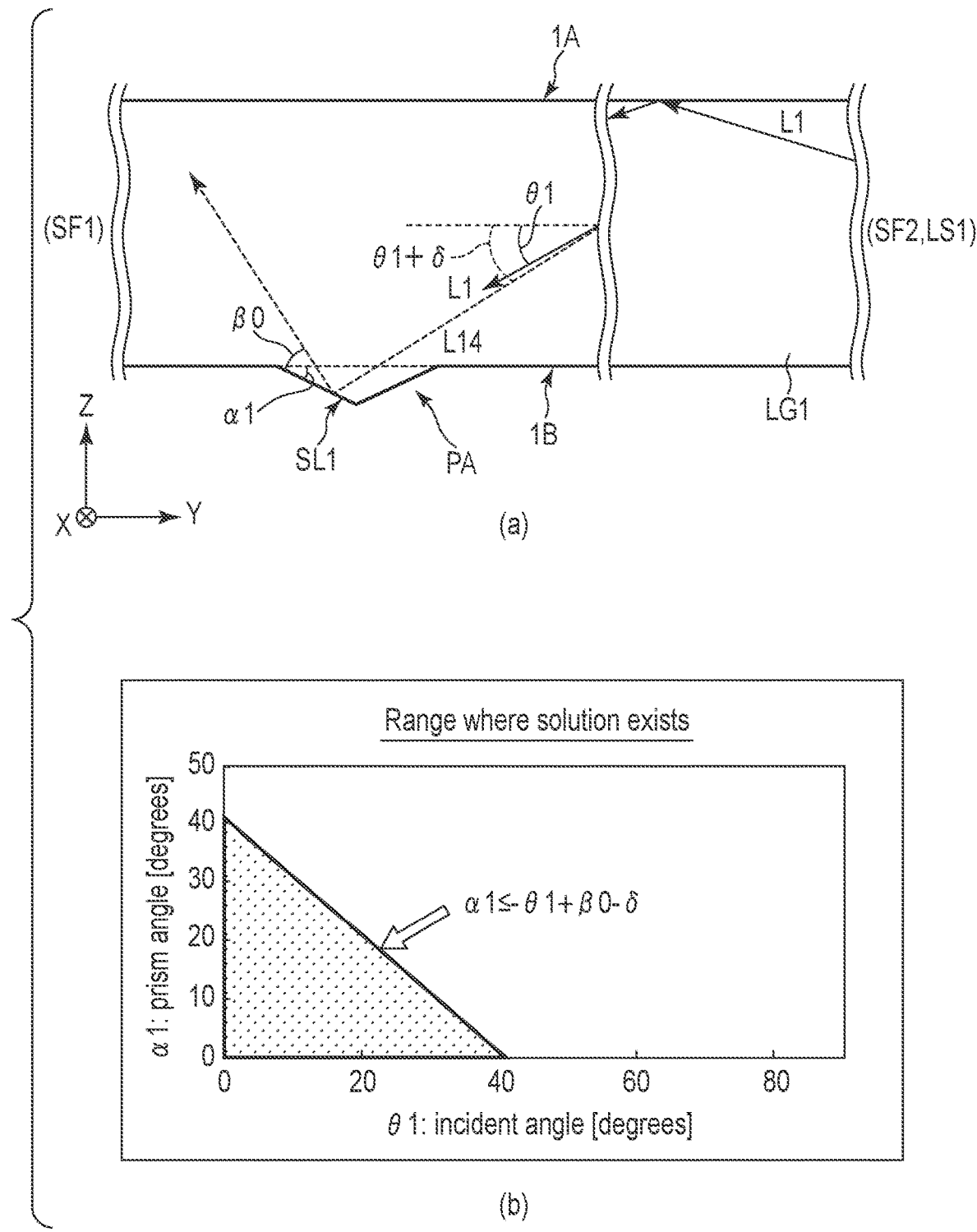
FIG. 10 is a partial cross-sectional view showing the light guide and the first layer, illustrating still other conditions for the maximum angular component to exit from the exiting surface.

In order for the light L14, which has an incident angle larger than that of the main ray L1, to be totally reflected by the slope SL1 on the back side of the prism PA without deviating from the total reflection condition, and proceed in the light guide LG1 as much as possible, the incident angle θ1 and the prism angle α1 should be set such that, as shown in FIG. 10, part (a), the maximum angular component of the incident angle θ1+δ are totally reflected by the slope SL1 on the back side of the prism PA without deviating from the total reflection condition, and proceeds in the light guide LG1.

As shown in FIG. 10, part (a), in order for the maximum angular component of the incident angle θ+δ to be totally reflected by the slope SL1 on the back side of the prism PA without deviating from the total reflection condition and proceed in the light guide LG1, the incident angle θ1 and the prism angle α1 should be set to satisfy the condition expressed by Formula (5) below.

$$\alpha 1 \leq -\theta 1+\beta 0-\delta \quad (5)$$

The horizontal axis of the graph shown in FIG. 10, part (b) indicates the incident angle θ1 of the main ray L1, and the vertical axis indicates the prism angle α1 of the prism PA. The dotted hatched area of the graph shown in FIG. 10, part (b) indicates a range in which a combination of the incident angle θ1 and the prism angle α1, that satisfy the condition of the formula (5) above can exist when the angle β0 for the total reflection condition is 48 degrees and the radiation angle δ of the incident light is 6.5 degrees. In other words, when the angle β0 of the total reflection condition is 48 degrees and the radiation angle δ of the incident light is 6.5 degrees, the incident angle θ1 and the prism angle α1 should be set to any of the values within the dotted hatched area, and thus, as shown in FIG. 10, part (a), the maximum angular component of the incident angle θ1+δ can be totally reflected by the slope SL1 on the back side of the prism PA without deviating from the total reflection condition and proceed within the light guide LG1.

Figure 11:
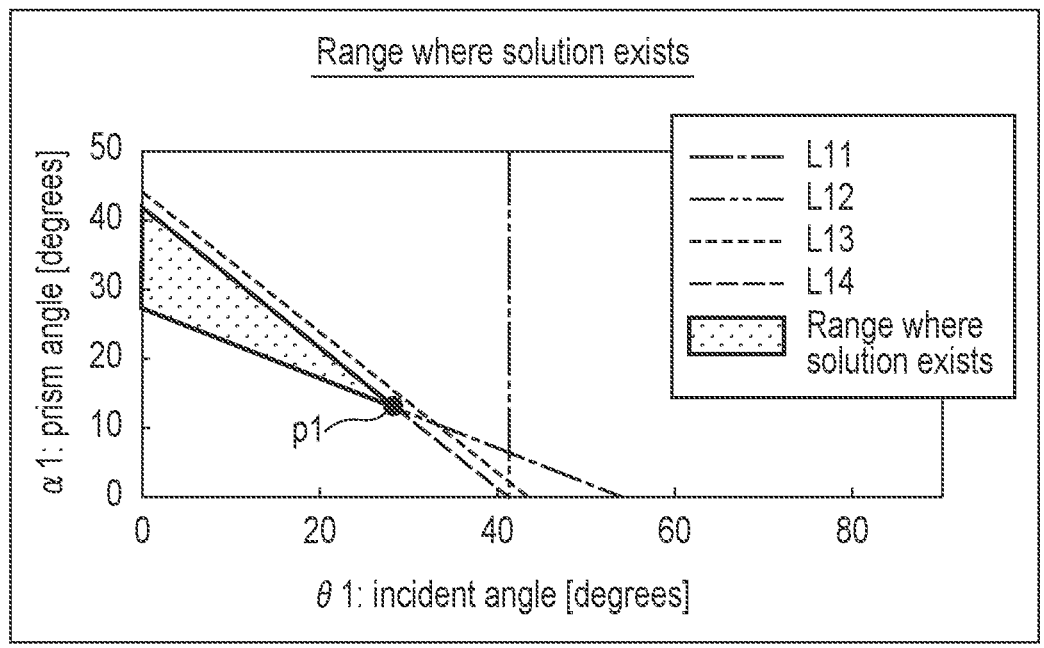
FIG. 11 is a graph illustrating incident angles and prism angles that can satisfy all the conditions shown in FIGS. 7 to 10.
Figure 12:
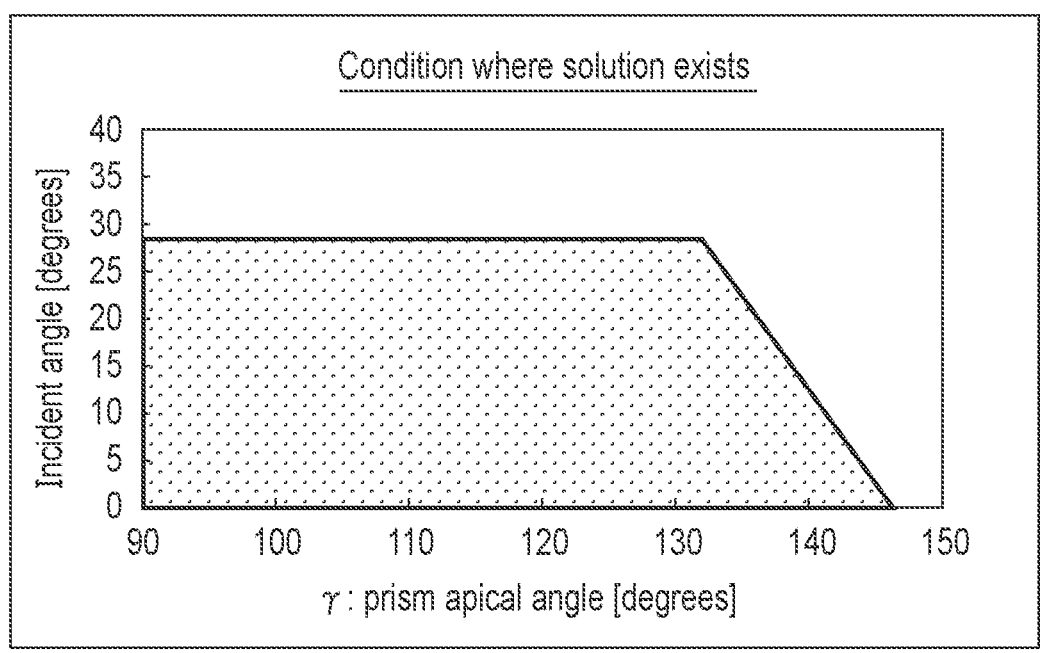
FIG. 12 is a graph illustrating prism apical angles that can satisfy all the conditions shown in FIGS. 7 to 10.

The range in which a combination of the incident angle θ1 and the prism angle α1 that satisfy the conditions of the formulas (2) to (5) described above can exist (the range where a solution exists) is indicated by the dotted hatching shown in FIG. 11. Further, the conditions for the prism apical angle γ, where a combination of the incident angle θ1 and the prism angle α1 that satisfy the conditions of the formulas (2) to (5) described above are indicated by the dotted hatching shown in FIG. 12. The prism apical angle γ can be calculated based on the above formula (4) by determining the incident angle θ1 and the prism angle α1.

As described above, by optimizing the incident angle θ1, the prism angle α1 and the prism apical angle γ, based on the formulas (2) to (5) provided above, the amount of escaping light L11 to L14 shown in FIG. 6 can be reduced, and the light-emitting efficiency of the illumination device IL can be improved.

Note that in general, as the incident angle θ1 is greater, the light-emitting efficiency of the illumination device IL can be further improved. On the other hand, as the prism angle α1 is greater, a more margin can be given to the processing accuracy of the prism pieces. For example, according to the combination of the incident angle θ1 and the prism angle α1 indicated at the point p1 in FIG. 11, the highest light-emitting efficiency of the illumination device IL can be achieved, whereas at the same time, it is difficult to process the prism pieces because a sufficient margin cannot be allowed in the processing accuracy of the prism pieces. Note here that the prism apical angle γ is related to the moldability during injection molding, and as the prism apical angle γ is larger, the moldability during injection molding can be more improved.

Here, an example of the advantageous effects of this embodiment will be specifically described.

Figure 13:
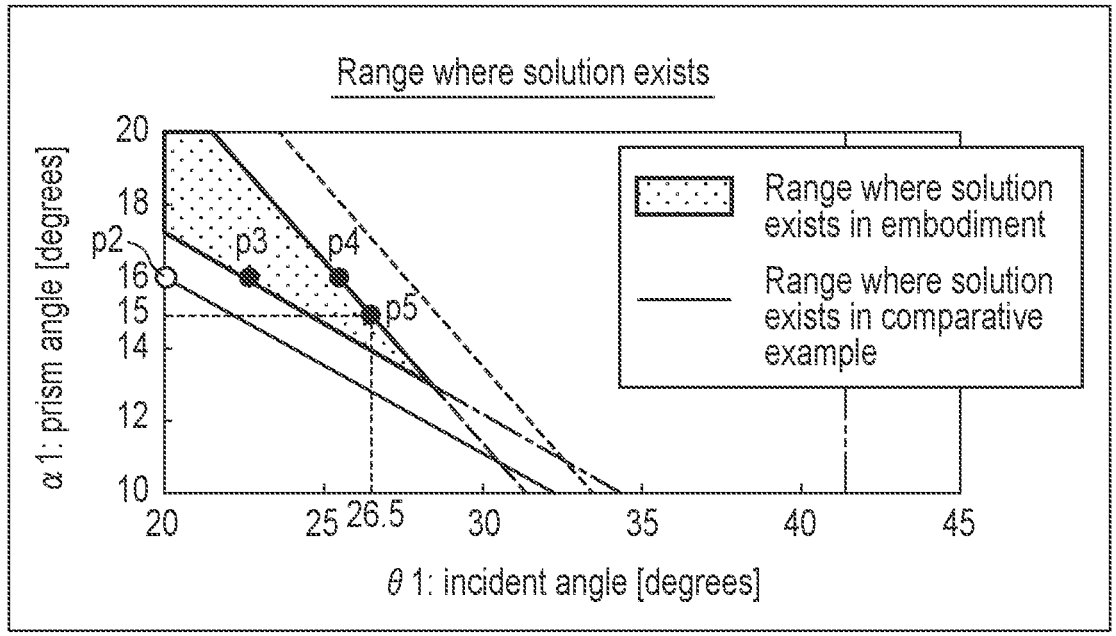
FIG. 13 is a graph illustrating the incident angle and prism angle of the light guide of the embodiment and an incident angle and a prism angle of the light guide according to a comparative example.

FIG. 13 is a graph showing combinations of the incident angle θ1 and the prism angle α1 in the light guide LG1 of this embodiment and combinations of the incident angle and the prism angle in a light guide according to a comparative example.

In the light guide LG1 of this embodiment, the incident angle θ1 and the prism angle α1 are set to any of the values within the dot-like hatched area. On the other hand, in the light guide of the comparative example, the incident angle and the prism angle are set to one of the values on the line segment indicated by the solid line in FIG. 13, and, for example, as indicated by a point p2, the incident angle is set to 20 degrees and the prism angle is set to 16 degrees. The light-emitting efficiency of the illumination device with the light guide of such a comparative example is approximately 70%, and thus approximately 30% of the light irradiated from the light source leaks outside from surfaces other than the light-exiting surfaces as the escaping light L11 to L14 shown in FIG. 6.

By contrast, when the prism angle α1 is set to 16 degrees in the light guide LG1 of this embodiment, the incident angle θ1 can be increased as compared to that of the comparative case as indicated by a point p3 or point p4 shown in FIG. 13. In other words, according to the light guide LG1 of this embodiment, it is possible to improve the light-emitting efficiency of the illumination device IL further than in the comparative case.

Note that according to the studies conducted by the inventors, when the inverted prism base angle α5 (and the inverted prism base angle α6) is set at 61.3 degrees, the elevation angle ε1 is 42 degrees, the refractive index n is 1.5, the angle β0 of the total reflection condition is 48 degrees, and the radiant angle δ is 6.5, the light-emitting efficiency of the illumination device IL can be improved to 90% as indicated by a point p5 in FIG. 13 by setting the incident angle θ1 to 26.5 degrees, the prism angle α1 to 15 degrees, and further the prism apical angle γ to 130 degrees. In other words, the light-emitting efficiency of the illumination device IL can be improved by approximately 20% compared to the comparative example.

According to the first embodiment described above, when the incident angle θ1 in the light guide LG1 and the light guide LG2, the prism angle α1 and the prism angle α2 of the prisms PA provided in the first layer P1, the prism angle α3 and the prism angle α4 of the prisms PB provided in the second layer P2, and the prism apical angle γ of the prisms PA and the prisms PB are set to the values that satisfy the conditions expressed by the above formulas (2) to (5), the escaping light L11 to L14 shown in FIG. 6 can be reduced, thereby making it possible to improve the light-emitting efficiency of the illumination device IL.

Second Embodiment

Figure 14:
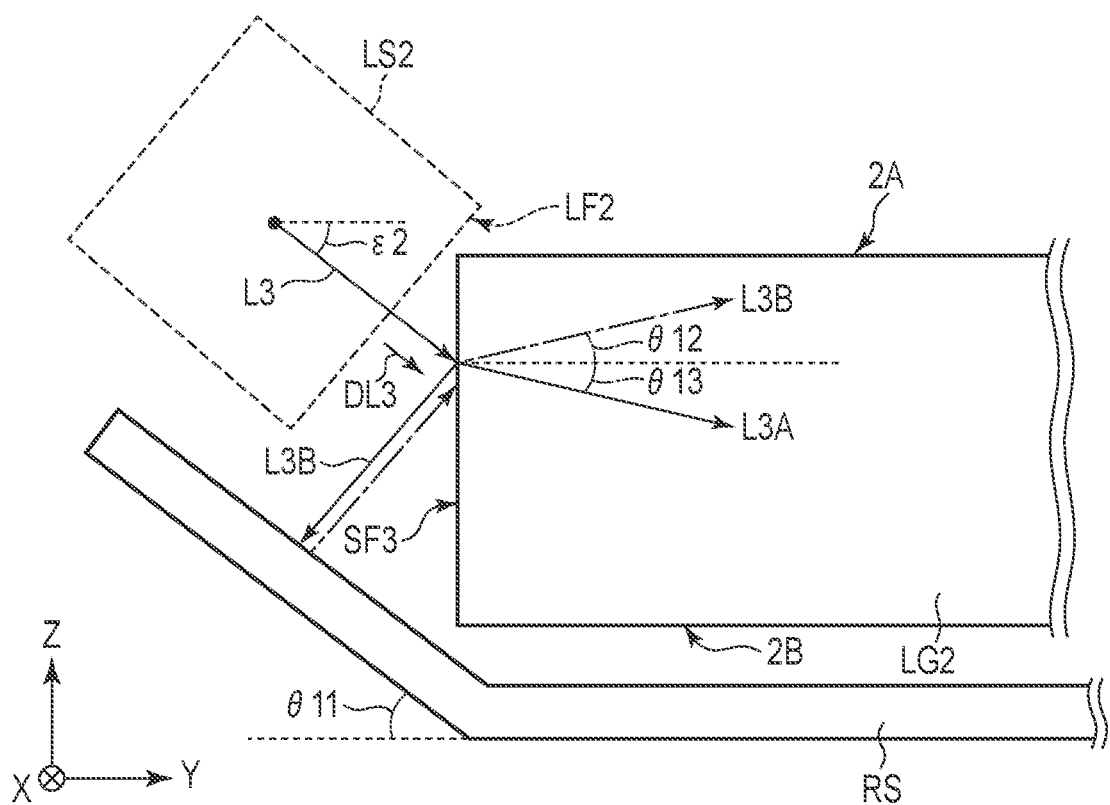
FIG. 14 is a partial cross-sectional view showing an example configuration of an illumination device according to the second embodiment.

Next, the second embodiment will be described with reference to FIG. 14. As shown in FIG. 14, the illumination device IL of the second embodiment is different in configuration from that of the first embodiment described above in that the end portion of the reflective sheet RS opposes the side surface SF3 of the light guide LG2.

Further, in this embodiment, the end portion of the reflective sheet RS opposes the side surface SF3 of the light guide LG2, and therefore the light-exiting surface LF2 of the light source LS2 opposes the main surface 2B of the light guide LG2. In this respect as well, it is different from the configuration of the first embodiment described above.

The light source LS2 irradiates light L3 towards the side surface SF3 in the light-emitting direction DL3. The light-emitting direction DL3 is not orthogonal to the side surface SF3. The light-emitting direction DL3 intersects the normal direction of the side surface SF3. Most of the light L3 emitted from the light source LS2 is refracted by the side surface SF3 and enters the light guide LG2 as light L3A. Part of the light L3 emitted from the light source LS2 is reflected as light L3B at the side surface SF3 and does not enter the light guide LG2. The reflective sheet RS reflect the light L3B that is reflected by the side surface SF3 and fails to enter the light guide LG2 by its bent end portion, so as to enter the light guide LG2.

Here, it is preferable that the angle θ11 made between the bent end portion of the reflective sheet RS and the direction Y should be set to such an angle that can make the incident angle θ12 of the light L3B reflected at the bent end portion of the reflective sheet RS in the light guide LG2 and. The angle θ11 is the incident angle θ12 at LG2 of light L3B reflected at the bent edge of the reflective sheet RS and the incident angle θ13 of the light L3A refracted by the side surface SF3 to enter the light guide LG2 in the light guide LG2 coincide with each other. In other words, the angle θ11 should be set so that the following formula for the relationship can be established between the angle θ11 between the bent end portion of the reflective sheet RS and the direction Y and the angle ε2 (the elevation angle ε2) between the light-emitting direction DL3 of the light source LS2 and the direction Y.

$$\theta 11 = 90 - \varepsilon 2 \tag{6}$$

For example, when the elevation angle ε2 is 42 degrees, the angle θ11 made between the bent end portion of the reflective sheet RS and the direction Y should be set at 48 degrees.

According to the second embodiment described above, the end portion of the reflective sheet RS on a third side surface SF side of the reflective sheet RS is bent at the angle θ11 that satisfies the above formula (6). With this structure, the light guide L3B, which is reflected before entering the light guide LG2 and cannot be extracted from the output surface, can be made incident to the light guide LG1, to be extracted from the light-emitting surface, in addition to the escaping light going outside from the light guide LG1 and the light guide LG2. Therefore, it is possible to further improve the light-emitting efficiency of the illumination device IL. Specifically, according to the studies made by the inventors, when the inverted prism base angle α5 (and the inverted prism base angle α6) is set to 61.3 degrees, the elevation angles ε1 and the elevation angle ε2 indicates 42 degrees, the refractive index n indicates 1.5, the angle β0 of the total reflection condition indicates 48 degrees, and the radiation angle δ indicates 6.5, the light-emitting efficiency of the illumination device IL can be enhanced to 93% by setting the incident angle θ1 (the incident angle θ12 and the incident angle θ13) to 26.5 degrees, the prism angle α1 to 15 degrees, the prism apical angle γ to 130 degrees, and bending the end portion on the third side surface SF3 side of the reflective sheet RS 48 degrees to oppose the third side surface SF3.

According to at least one of the embodiments described above, it is possible to provide an illumination device IL and a display device DSP in which the light-emitting efficiency can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An illumination device comprising:
a first light guide including a first main surface, a second main surface located on an opposite side to the first main surface, a first side surface, and a second side surface located on an opposite side to the first side surface along a first direction,
a first light source opposing the second side surface and emitting light to the second side surface;
a first layer including a first prism provided on the second main surface, a second light guide including a third main surface opposing the second main surface, a fourth main surface located on an opposite side to the third main surface, a third side surface aligned with the first side surface along a second direction intersecting the first direction, and a fourth side surface located on an opposite side to the third side surface along the first direction and aligned with the second side surface along the second direction;

a second light source opposing the third side surface and emitting light toward the third side surface;

a second layer including a second prism provided on the fourth main surface; and a reflective sheet opposing the fourth main surface and reflecting light leaking from the second light guide, the first prism protruding from the second main surface toward the opposite side to the first main surface and having a cross-sectional shape of a triangle with a first slope located on a side of the first side surface and a second slope located on a side of the second side surface, conditions indicated by the following formulas (1) to (4) being satisfied:

$$\alpha 1 \geq \frac{\beta 0 - \theta 1 + \delta}{2} \quad (1)$$

$$\theta 1 \leq \beta 0 - \delta \quad (2)$$

$$\alpha 1 \leq -\theta 1 + (180 - \gamma) - \delta \quad (3)$$

$$\alpha 1 \leq -\theta 1 + \beta 0 - \delta \quad (4)$$

where $\theta 1$ represents an incident angle of the light emitted from the first light source and entering the first light guide from the second side surface, $\alpha 1$ represents an angle between the first slope and the first direction, and $\gamma$ represents an angle between the first slope and the second slope, $\beta 0$ represents an angle for the light entering the first light guide to be totally reflected by the first main surface and the second main surface, and $\delta$ represents a range in which the light entering the first guide is diffused, and an end portion on a side of the third side surface of the reflective sheet being bent to oppose the third side surface, and an edge on a side of the fourth side surface of the reflective sheet not opposing the fourth side surface.

2. The illumination device of claim 1, wherein the above-provided $\theta 1$ is calculated out based on the following formula (5):

$$\theta 1 = \sin^{-1}\left\{\left(\frac{1}{n}\right)\sin\varepsilon 1\right\} \quad (5)$$

where $\varepsilon 1$ indicates an angle between the light emitted from the first light source and the first direction, and n indicates the refractive index of the first light guide.

3. The illumination device of claim 2, wherein when the above-provided $\varepsilon 1$ indicates 42 degrees, the above-provided n indicates 1.5, the above-provided $\beta 0$ indicates 48 degrees and the above-provided $\delta$ indicates 6.5 degrees, the above-provided $\theta 1$ indicates 26.5 degrees, the above-provided $\alpha 1$ indicates 15 degrees, and the above-provided $\gamma$ indicates 130 degrees.

4. The illumination device of claim 1, wherein the second prism protrudes from the fourth main surface toward the opposite side to the third main surface and has a cross-sectional shape of a triangle including a third slope located on a side of the third side surface and a fourth slope located on a side of the fourth side surface, and an incident angle of the light emitted from the second light source and entering the second light guide from the third side surface is set to a same value as the above-provided $\theta 1$, and an angle made between the fourth slope and the first direction is set to a same value as the above-provided $\alpha 1$, and an angle made between the third slope and the fourth slope is set to a same value as the above-provided $\gamma$.

5. The illumination device of claim 4, wherein an angle made between a bent portion of the reflective sheet and the first direction is set to such a value that the incident angle of the light entering the second light guide from the third side surface and the incident angle of the light reflected at the third side surface and then reflected again at the bent portion and entering the second light guide coincide with each other.

6. The illumination device of claim 1, wherein the first light source and the second light source are laser light sources.

7. A display device comprising:
an illumination device of claim 1; and
a display panel which displays images,
the display panel opposing the first main surface.

* * * * *